United States Patent
Evans

(10) Patent No.: US 10,686,345 B2
(45) Date of Patent: Jun. 16, 2020

(54) SHORT CIRCUIT STOP STUD LOCKING PLATE

(71) Applicant: SIEMENS ENERGY, INC., Orlando, FL (US)

(72) Inventor: Eric Evans, Waxhaw, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 374 days.

(21) Appl. No.: 15/620,928

(22) Filed: Jun. 13, 2017

(65) Prior Publication Data
US 2018/0358859 A1  Dec. 13, 2018

(51) Int. Cl.
*F16B 39/10* (2006.01)
*H02K 3/50* (2006.01)
*H02K 11/20* (2016.01)

(52) U.S. Cl.
CPC ............ *H02K 3/50* (2013.01); *F16B 39/108* (2013.01); *H02K 11/20* (2016.01); *H02K 2211/00* (2013.01)

(58) Field of Classification Search
CPC ... F16B 39/103; F16B 39/108; Y10S 411/983
USPC ........................................................ 411/122
See application file for complete search history.

(56) References Cited

U.S. PATENT DOCUMENTS

| | | | | |
|---|---|---|---|---|
| 174,560 A | * | 3/1876 | Onions | F16B 39/32 411/132 |
| 326,700 A | * | 9/1885 | Wisdom | F16B 39/108 411/123 |
| 722,649 A | * | 3/1903 | Bartley | F16B 39/108 411/123 |
| 763,049 A | * | 6/1904 | Degner | F16B 39/108 411/123 |
| 905,842 A | * | 12/1908 | Campbell | F16B 39/108 411/123 |
| 936,299 A | * | 10/1909 | Braune | F16B 39/108 411/123 |
| 1,130,851 A | * | 3/1915 | Shekleton | F16B 39/108 411/201 |
| 1,327,435 A | * | 1/1920 | Kurtz | F16B 39/108 411/123 |
| 1,357,389 A | * | 11/1920 | Evans | F16B 39/108 411/201 |
| 2,431,480 A | * | 11/1947 | Hornsby | F16B 39/108 411/123 |

* cited by examiner

*Primary Examiner* — Flemming Saether

(57) ABSTRACT

An assembly having a positive locking device is provided. The assembly includes a solid body having a through hole arranged to receive a fastener. A fastener is disposed in the through hole of the solid body and secured to the solid body using a securing means. The locking plate positively locks the securing means onto the fastener. A generator including the assembly as well as a method to set a short circuit stop gap between the assembly and a support brace support the stator winding is also provided.

13 Claims, 3 Drawing Sheets

SHORT CIRCUIT STOP STUD LOCKING PLATE

BACKGROUND

1. Field

The present application relates generally to generators, and more particularly to an assembly including a positive locking device and a corresponding method to set a gap between a short circuit stop stud assembly and a brace supporting the stator winding.

2. Description of the Related Art

A generator is a component of a power plant that converts mechanical energy to electrical energy. The generator comprises a stator core wound by stator windings in which a current develops as a result of an electromagnetic force created by a rotating generator rotor.

The electromagnetic force created by the rotor may cause the stator windings to physically move. Because of this movement, generators are designed to allow for some freedom of movement during normal operation in both an axial direction and a radial direction. However, serious events, or faults, such as a close in fault or an out of phase synchronization, may occur within the generator causing the stator winding to be severely shaken or jerked around with the result that in certain instances the windings are broken. In order to minimize damage occurring to the stator windings in the event of one these serious fault conditions, the generator has been designed to restrict movement of the stator winding during a detected serious fault condition.

In order to restrict movement of the stator winding during a fault condition, a plurality of braces running axially are disposed circumferentially around the stator core and are mounted to the end winding of the stator core. These braces lie in close proximity to an end plate of the stator core. The braces support the end winding and are designed to move with the stator winding during normal operation and to restrict the movement during fault occurrences.

One currently used method to restrict the movement of the braces during a fault occurrence is to provide a short circuit stop stud assembly next to the brace with a small gap in between the brace and the short circuit stop stud assembly. This enables a freedom of movement for the brace and attached stator winding during normal operating conditions and restricts the movement during a fault occurrence. However, after the winding, brace and short circuit stop stud assembly have been in operation over time, a sufficient gap may no longer exist and the gap may need to be reset.

SUMMARY

Briefly described, aspects of the present disclosure relates to an assembly having a positive locking device and a method to set a short circuit stop gap between an assembly and a support brace supporting the stator winding.

An assembly having a positive locking device is provided. The assembly includes a solid body having a through hole arranged to receive a fastener. A fastener is disposed in the through hole of the solid body and secured to the solid body using a securing means. The locking plate positively locks the securing means onto the fastener.

A method to set a short circuit stop gap between the assembly as described above and a support brace supporting the stator winding is provided. The method includes disposing the assembly between an end plate of a generator stator core and the support brace, securing the securing means onto the fastener, installing the locking plate onto the fastener, and locking the securing means using the locking plate.

A generator is also provided. The generator includes a stator core comprising a plurality of stator windings including an end winding. A plurality of support braces are disposed circumferentially around the stator core and mounted to the end winding. The plurality of support braces support the end winding and restrict the movement of the stator core. An assembly as described above including a positive locking device is disposed between an end plate of a generator stator core and a support brace. A predefined gap exists between the fastener of the assembly and the support brace to allow for a restricted amount of movement of the stator core.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
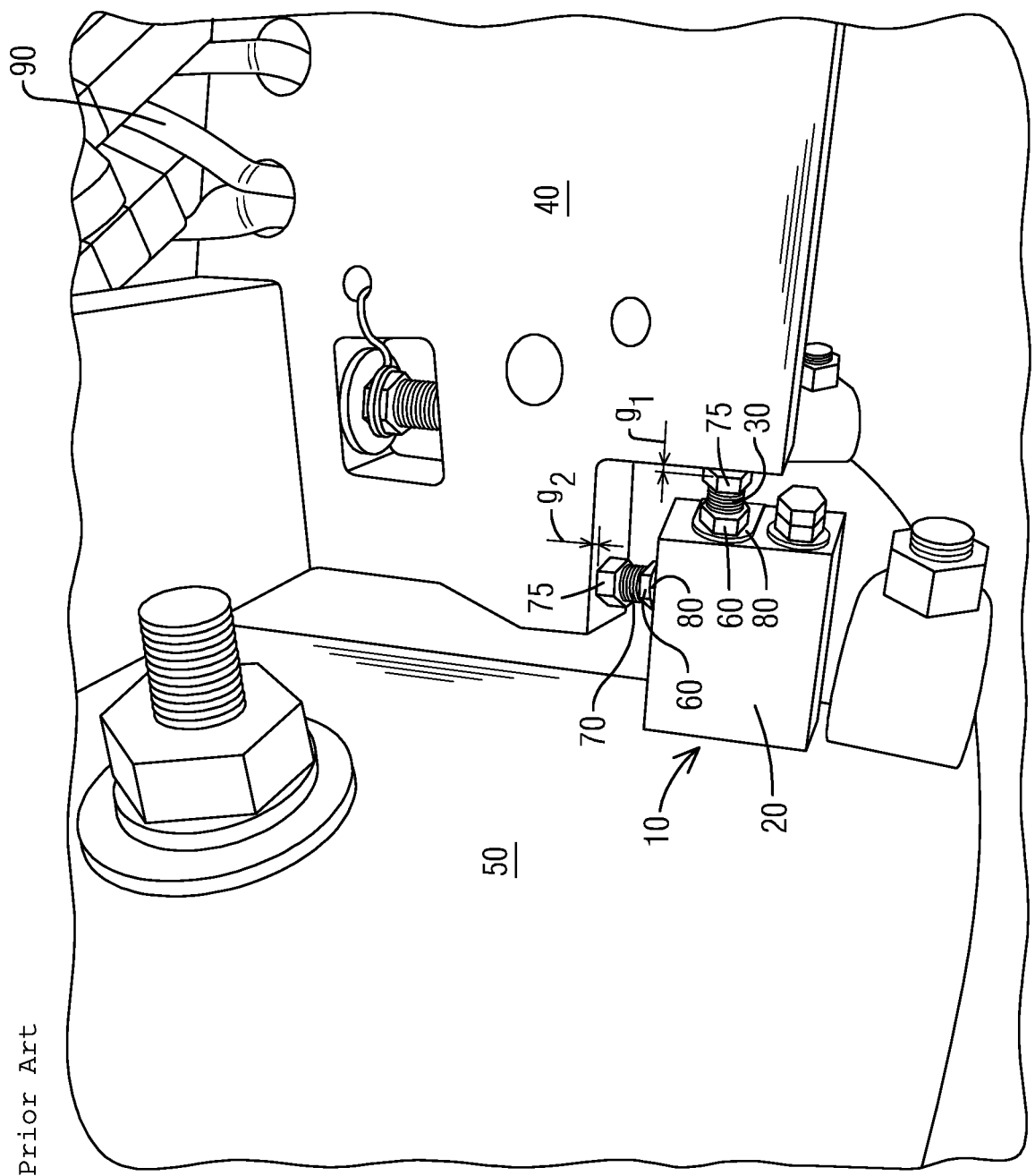
FIG. 1 is a perspective view of a short circuit stop stud assembly coupled to a stator core end plate.

A short circuit stop stud assembly may be employed to help control the movement of the braces. The short circuit stop stud assembly 10, as illustrated in FIG. 1, comprises a solid body 20, shown in FIG. 1 as a metallic block, including three bolts, a bolt running axially 30, a bolt running radially 70, and a bolt used to secure the metal block to the end plate 50 of the stator core. In its assembled state, the short circuit stop stud assembly 10 may be disposed between a brace 40 and the stator core end plate 50. The axial bolt 30 may be employed to restrict the axial movement of the stator winding 90. Between the head of the axial bolt 30 and the brace 40 a small gap ($g_1$), for example 0.002 in., exists. Likewise, the radial bolt 70 restricts the radial movement of the stator winding 90. Between the head of the radial bolt 70 and the brace 40 a small gap ($g_2$) which may also be approximately 0.002 inch, exists. Thus, during normal operation, the stator core may move freely. However, in the event of a serious event or fault condition, the movement of the stator core is restricted by the short circuit stop stud assembly 10 preventing serious damage from occurring to the stator winding 90.

Figure 2:
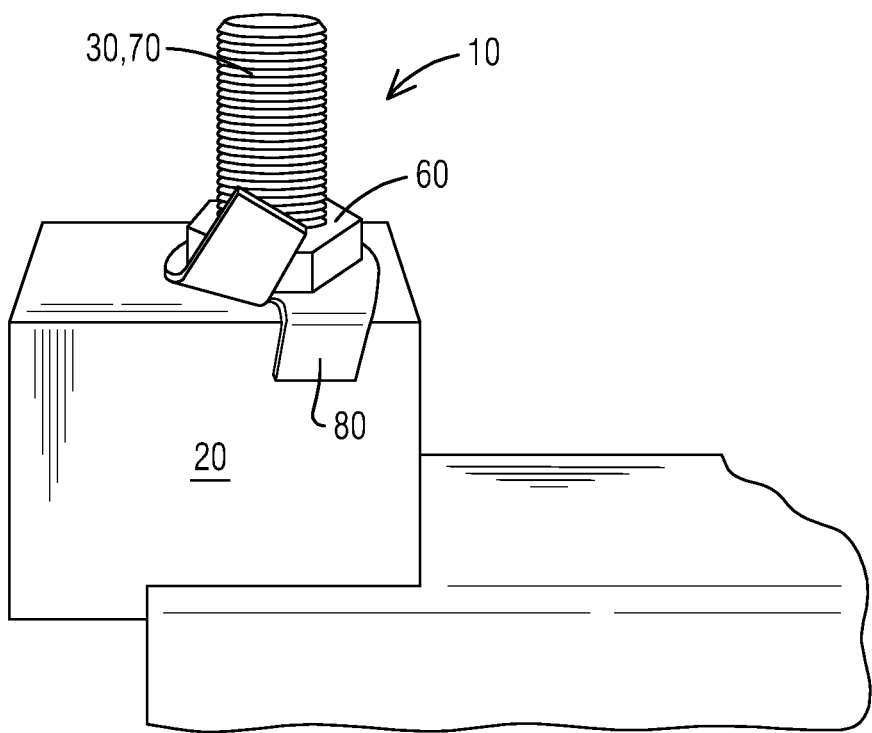
FIG. 2 is a side view of a known short circuit stop assembly.

A securing means 60, such as a nut, may be used to secure each bolt 30, 70 to the metal block 20 once the gap ($g_1$, $g_2$) is set to a desired distance. Currently, a corresponding pantleg washer 80 secures, or locks, the securing means 60 to the metal block 20, by providing a positive rotation stopping force. The pantleg washer 80 thereby prevents the nut 60 from loosening, which prevents the bolt 30, 70 from loosening. As illustrated in FIG. 2, one leg of a pantleg washer 80 may be bent downwards over an edge of the metal block 20 and another leg may bent upwards onto a flat edge of the securing means 60. This configuration of the pantleg washer 80 prevents rotation and loosening of the securing means 60, thereby preventing the bolt 30, 70 from loosening.

Figure 3:
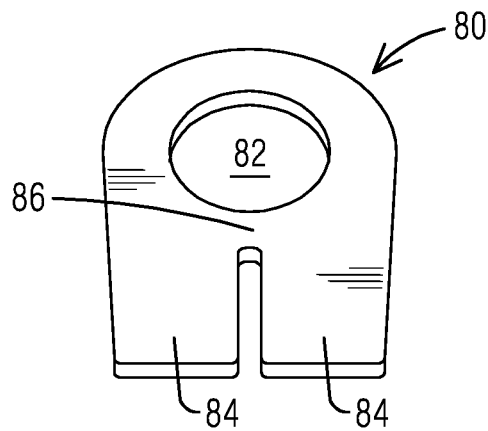
FIG. 3 is an elevational view of a known pantleg washer.

A known design of a pantleg washer 80 may be seen in FIG. 3. As illustrated, the pantleg washer 80 comprises a planar body including a through-hole 82 through which a fastener 30, 70 may be disposed. The pantleg washer 80 further comprises two legs 84 connected by a ligament 86.

Transportation and operation of the generator may close the radial and axial short circuit stop gaps ($g_1$, $g_2$). In order to readjust each gap ($g_1$, $g_2$), the corresponding bolt 30, 70 may need to be readjusted. Readjusting the bolt 30, 70 may include bending one leg of a pantleg washer 80 off of the securing means 60 so that the securing means 60 and the corresponding bolt 30, 70 may be loosened. At this point, the bolt 30, 70 may be readjusted within the through-hole 82. The securing means 60 is then torqued onto the bolt 30, 70. However, because the bolt 30, 70 is held captive and the design of the pantleg leg washer 80 includes the ligament between the legs, the prior art pantleg washer 80 cannot be replaced when the short circuit stop gap ($g_1$, $g_2$) is readjusted. Additionally, the prior art design of the pantleg washer did not allow for the pantleg washer to be reused.

Consequently, a new locking mechanism and method to reset the gaps ($g_1$, $g_2$) between the stop stud assembly bolts 30, 70 and the brace 40 is desired.

An assembly 10 including a positive locking device that may be replaced is now proposed. The positive locking device resists rotation by providing a positive rotation stopping force. This is in contrast to a common lock washer which resists rotation by increasing friction. The assembly 10 includes a solid body 20 including a through hole arranged to receive a fastener 30, 70. In one embodiment, the solid body 20 may comprise a solid rectangular body such as the metal block shown in FIGS. 1 and 2. A fastener 30, 70 may be disposed in the through hole of the hollow body 20. The fastener 30, 70 may comprise a bolt including a head 75. However, the fastener may also include a stud, threaded fastener, etc.

The positive locking device may be embodied as a U-shaped locking plate 100. In an embodiment, the positive locking plate 100 may be horseshoe-shaped such that the open end is narrower than the closed end. The locking plate 100 may be installed onto the fastener 30, 70 such that the fastener 30, 70 passes through the interior opening of the locking plate 100. A securing means 60 secures the fastener 30, 70 to the hollow body 20. The locking device 100 positively locks the securing means 60 onto the fastener 30, 70.

Figure 4:
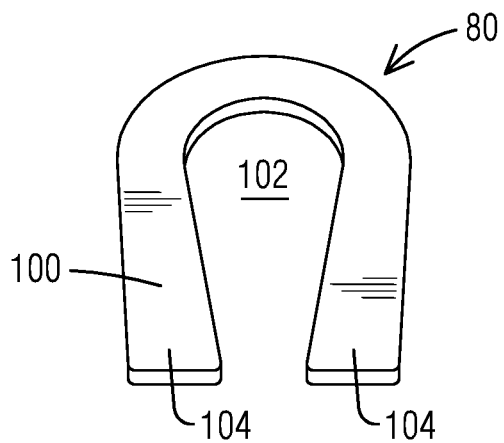
FIG. 4 is an elevational view of a locking plate according to an embodiment.

A horseshoe-shaped embodiment of the locking plate 100 may be seen in FIG. 4. The locking plate 100 includes a planar body having two legs 104 separated by an interior opening 102. The distance between the legs of the closed end of the planar body is wider than the distance between the legs of the open end such that the legs taper inwards towards the interior opening. Once installed, but before tightening, this design may prevent the locking plate 100 from falling off the fastener 30, 70. In contrast to the prior art design of the pantleg washer 80, no ligament connects the two legs 104 enabling a removal of the locking plate 100 from a captive fastener 30, 70. The locking plate 100 is configured such that each leg 104 may bend in a direction normal to the plane of the body.

Figure 5:
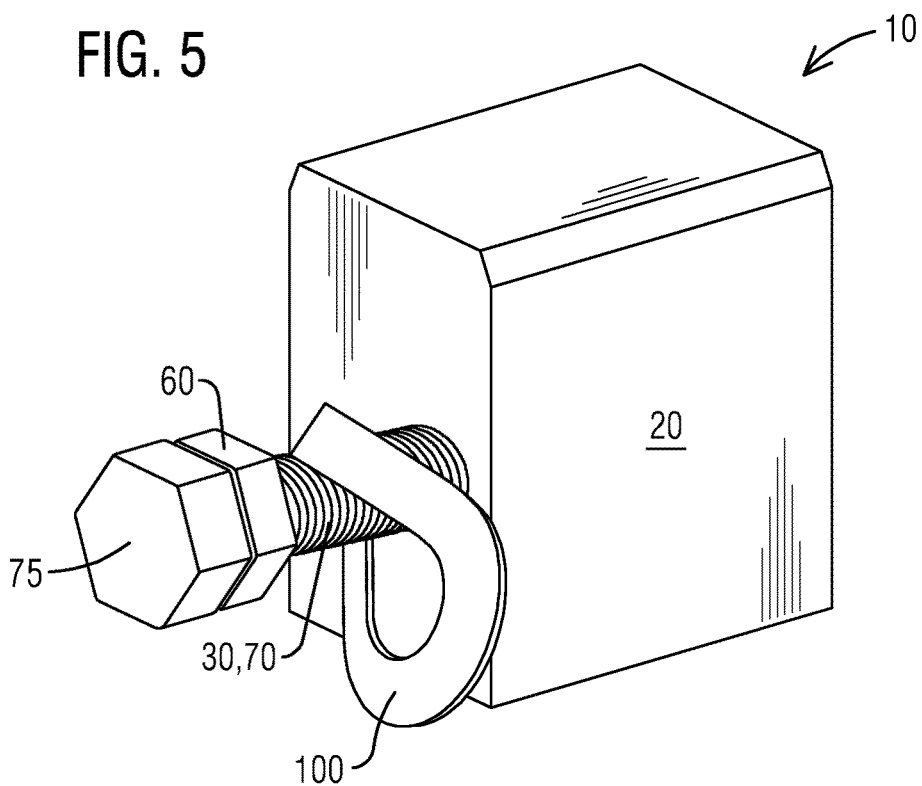
FIG. 5 is a side view of a locking plate partially installed.

In an embodiment, the distance between the legs 104 of the locking plate 100 at the leg ends is smaller than the diameter of the fastener 30, 70. In order to install the locking plate 100 over the fastener 30, 70, one leg of the locking plate 100 is bent in a direction normal to the surface of the locking plate 100 and the other leg is bent in the opposite direction. A locking plate 100 partially installed over a fastener 30, 70 with the legs bent in the described manner may be seen in FIG. 5. With this configuration, i.e., the legs 104 bent in opposing directions, the locking plate 100 may easily fit over the fastener 30, 70 so that the interior curved portion of the locking plate 100 abuts the curved portion of the fastener 30, 70. The locking plate 100 may be secured onto the fastener 30, 70 by bending one leg 104 over an edge of the hollow body 20 so that the leg is flattened against a face of the hollow body 20. The other leg may be bent over a flat edge of the securing means 60 so that the further leg 104 is flattened against a flat face of the securing means 60. Once secured, the locking plate 100 may prevent rotation and loosening of the securing means 60.

In an embodiment, the locking plate 100 may be removable from the assembly 10. In order to remove the locking plate 100 from the assembly 10, the leg 104 flattened against the securing means 60 may be bent away from the flat edge so that the securing means 60 may be loosened. Likewise, the leg 104 flattened over the edge of the solid body 20 may be bent away from the solid body 20. After loosening the securing means 60 the locking plate 100 may be removed from the assembly 10.

In an embodiment, a locking plate 100 may be installed over an existing pantleg washer 80 already installed onto the assembly 10. The installation of the locking plate 100 over the pantleg washer 80 would entail the same steps as previously described.

Referring to FIGS. 1-6, a method to set a short circuit stop gap ($g_1$, $g_2$) between an assembly 10 and a support brace 40 supporting an end winding 90 of a generator stator core is also provided. The method includes disposing a short circuit stop gap assembly 10, as described above, between the end plate 50 of the stator core and the support brace 40. The assembly 10 is coupled to the end plate 50 by a fastener 30, 70. The stop gaps ($g_1$, $g_2$) between the head 75 of the axial fastener 30 or radial fastener 70 and the support brace 40 may then be adjusted. According to the method, each stop gap ($g_1$, $g_2$) may be adjusted by positioning the fastener 30, 70 with respect to the through hole such that a desired stop gap distance ($g_1$, $g_2$) is set. The securing means 60, such as a nut, may then be secured onto the fastener 30, 70. The proposed locking plate 100 may then be installed onto the fastener 30, 70.

In an embodiment, the installation of the locking plate 100 includes bending one leg 104 of the locking plate 100 over an edge of the hollow body 20. The installation may also include bending a further leg 104 over a flat edge of the securing means 60 so that the further leg 104 is flattened against a flat face of the securing means 60. In this configuration, the securing means 60 is prevented from rotating and/or loosening off of the fastener 30, 70.

In an embodiment, the locking plate 100 is removable from the fastener 30, 70 such that during an adjustment of the stop gaps (g₁, g₂), the locking plate 100 may be removed and another locking plate may be installed.

Figure 6:
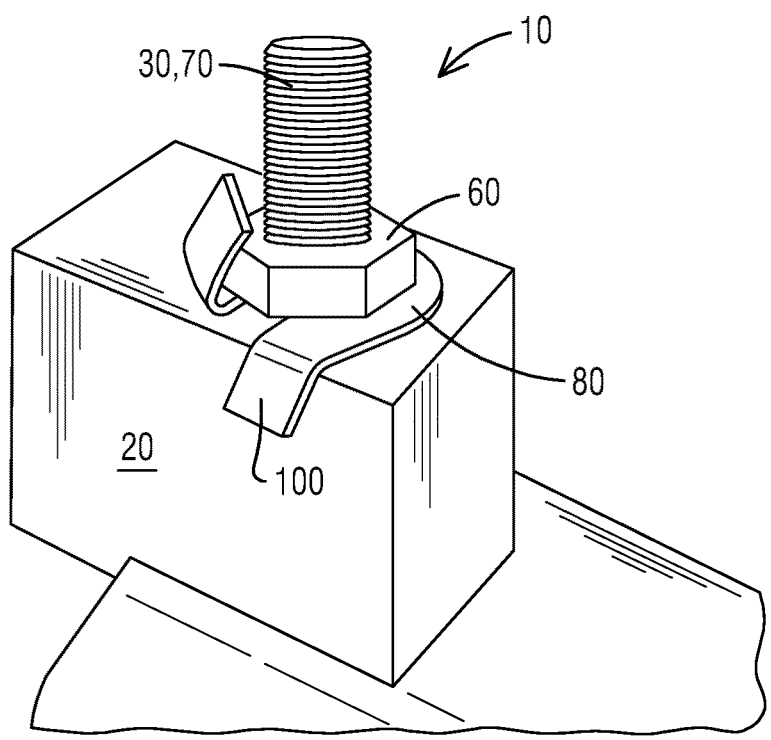
FIG. 6 is a side view of a secured short circuit stop assembly.

FIG. 6 illustrates a side view of a secured short circuit stop gap assembly 10 including a locking plate 100 according to an embodiment. The embodiment illustrates the installed configuration of the locking plate 100 onto the nut 60 with one leg bent upwards onto the nut 60 and one leg bent downwards onto the hollow body 20. The design of the locking plate 100 prevents the nut 60 from rotating and/or loosening while allowing replacement if necessary. The replacement may be performed without cutting or grinding the locking plate 100.

In operation, the disclosed assembly and method can be used to reliably and cost-effectively replace the functionality of the pantleg washer to securely lock the securing means onto a fastener with another locking mechanism. In contrast to the pantleg washer, the locking plate may be replaced after use when the stop gap is readjusted. The new locking mechanism may be installed directly over the existing pantleg washers. Embodiments of the disclosed method are effective for quick adjustment of the stop gaps when the generator is in an outage state. Furthermore, the torque necessary to rotate the nut past the secured locking plate would not be significantly different than the torque needed to rotate the nut past the pantleg washer.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A assembly having a positive locking device, comprising:
    a solid body including a through hole arranged to receive a fastener;
    a fastener disposed in the through hole of the solid body;
    a U-shaped locking plate having an open interior opening, wherein through the interior opening the fastener passes before entering the through-hole of the solid body; and
    a securing means to secure the fastener to the solid body, wherein the locking plate positively locks the securing means onto the fastener, wherein the locking plate is horseshoe-shaped such that the open end is narrower than the closed end.

2. The assembly as claimed in claim 1, wherein the solid body comprises a solid rectangular shape.

3. The assembly as claimed in claim 2, wherein in order to secure the securing means onto the fastener and prevent rotation of the securing means, a leg of the locking plate is configured to be bent over an edge of the hollow body so that the leg is flattened against a face of the body, and a further leg is configured to be bent over a flat edge of the securing means so that the further leg is flattened against a flat face of the securing means.

4. The assembly as claimed in claim 3, wherein the locking plate is removable from the assembly.

5. The assembly as claimed in claim 1, wherein the distance between the tips of the legs of the locking plate is smaller than a diameter of the fastener.

6. The assembly as claimed in claim 1, wherein the fastener is selected from the group consisting of a bolt, a stud, and a threaded fastener.

7. A generator, comprising:
    a stator core comprising a plurality of stator windings including an end winding;
    a plurality of support braces disposed circumferentially around the stator core and mounted to the end winding, the plurality of support braces supporting the end winding and restricting movement of the stator core;
    an assembly having a positive locking device as claimed in claim 1,
    wherein the assembly is disposed between an end plate of a generator stator core and a support brace of the plurality of support braces, and
    wherein a predefined gap exists between the fastener of the assembly and the support brace to allow for a restricted amount of movement of the stator core.

8. The generator as claimed in claim 7, wherein the hollow body comprises a solid rectangular shape.

9. The generator as claimed in claim 8, wherein in order to secure the securing means onto the fastener and prevent rotation of the securing means, a leg of the locking plate is bent over an edge of the hollow body so that the leg is flattened against a face of the body, and a further leg is bent over a flat edge of the securing means so that the further leg is flattened against a flat face of the securing means.

10. The generator as claimed in claim 9, wherein the locking plate is removable from the assembly.

11. The generator as claimed in claim 7, wherein the locking plate is horseshoe-shaped such that the open end is narrower than the closed end.

12. The generator as claimed in claim 7, wherein the distance between the tips of the legs of the locking plate is smaller than the diameter of the fastener.

13. The generator as claimed in claim 7, wherein the fastener is selected from the group consisting of a bolt, a stud, and a threaded fastener.

* * * * *